United States Patent
Zhang et al.

(10) Patent No.: US 11,736,800 B2
(45) Date of Patent: Aug. 22, 2023

(54) METHOD, APPARATUS, AND DEVICE FOR IMAGE CAPTURE, AND STORAGE MEDIUM

(71) Applicant: REMO TECH CO., LTD., Guangdong (CN)

(72) Inventors: Ming Zhang, Guangdong (CN); Jian Dong, Guangdong (CN)

(73) Assignee: REMO TECH CO., LTD.

( * ) Notice: Subject to any disclaimer, the term of this patent is extended or adjusted under 35 U.S.C. 154(b) by 60 days.

(21) Appl. No.: 17/606,075

(22) PCT Filed: Aug. 30, 2019

(86) PCT No.: PCT/CN2019/103656
§ 371 (c)(1),
(2) Date: Oct. 25, 2021

(87) PCT Pub. No.: WO2020/248396
PCT Pub. Date: Dec. 17, 2020

(65) Prior Publication Data
US 2022/0201219 A1     Jun. 23, 2022

(30) Foreign Application Priority Data
Jun. 12, 2019   (CN) .......................... 201910506435.6

(51) Int. Cl.
*H04N 23/695*     (2023.01)
*H04N 23/69*      (2023.01)

(52) U.S. Cl.
CPC ........... *H04N 23/695* (2023.01); *H04N 23/69* (2023.01)

(58) Field of Classification Search
CPC ...... H04N 23/695; H04N 23/69; H04N 23/60; H04N 23/61; H04N 23/64; H04N 23/611;
(Continued)

(56) References Cited

U.S. PATENT DOCUMENTS 5,629,988 A  *  5/1997 Burt ...................... G06T 7/254
                                              348/E5.046
6,327,536 B1 * 12/2001 Tsuji ....................... B60R 11/04
                                              701/301
(Continued)

FOREIGN PATENT DOCUMENTS

CN    102710896    10/2012
CN    103905733     7/2014
(Continued)

OTHER PUBLICATIONS

State Intellectual Property Office of People's Republic of China, Supplementary Search Report for Application No. 2019105064356, dated Jun. 12, 2019, China.
(Continued)

*Primary Examiner* — Chiawei Chen
(74) *Attorney, Agent, or Firm* — McDonald Hopkins LLC

(57) ABSTRACT

Provided are a method, apparatus and device for image capturing and a storage medium. The method includes acquiring the bounding box of a lens tracking target in an image to be captured; using a pre-trained reference model to predict the first reference position of the image to be captured; and determining a lens movement offset based on the position of each pixel in the bounding box and the first reference position.

17 Claims, 6 Drawing Sheets

(58) Field of Classification Search
CPC . G06T 2207/20021; G06T 2207/20081; G06T 2207/20084; G06T 2207/30196; G06T 7/246; G06T 2210/12; G06V 30/414
See application file for complete search history.

(56) References Cited

U.S. PATENT DOCUMENTS

| | | | | |
|---|---|---|---|---|
| 10,048,749 | B2* | 8/2018 | Miao | G06V 40/19 |
| 10,699,421 | B1* | 6/2020 | Cherevatsky | G06V 20/52 |
| 2003/0161049 | A1* | 8/2003 | Okada | G02B 7/102 |
| | | | | 359/696 |
| 2014/0313373 | A1* | 10/2014 | Sugawara | H04N 23/80 |
| | | | | 348/352 |
| 2016/0227104 | A1* | 8/2016 | Guan | H04N 23/675 |
| 2017/0244887 | A1 | 8/2017 | Shibagami | |
| 2017/0374272 | A1* | 12/2017 | Tsuji | H04N 5/2226 |
| 2018/0189228 | A1* | 7/2018 | Park | G06F 18/2193 |
| 2018/0189609 | A1* | 7/2018 | Park | G06V 10/7788 |
| 2019/0114804 | A1* | 4/2019 | Sundaresan | G06T 7/74 |
| 2020/0314329 | A1* | 10/2020 | Katou | H04N 23/695 |

FOREIGN PATENT DOCUMENTS

| | | |
|---|---|---|
| CN | 107749952 | 3/2018 |
| CN | 108960090 | 3/2018 |
| CN | 108200344 | 6/2018 |
| CN | 108234872 | 6/2018 |
| CN | 109064514 | 12/2018 |
| CN | 109087337 | 12/2018 |
| CN | 109117794 | 1/2019 |
| CN | 109803090 | 5/2019 |
| CN | 110072064 | 7/2019 |

OTHER PUBLICATIONS

State Intellectual Property Office of People's Republic of China, Notification of First Office Action for Application No. 2019105064356, dated Nov. 27, 2019, China.
Patent Cooperation Treaty (PCT), International Search Report and Written Opinion for Application PCT/CN2019/0103656 filed on Aug. 30, 2019, dated Mar. 13, 2020, International Searching Authority, CN.
State Intellectual Property Office of People's Republic of China, Search Report for Application No. 2019105064356, China.

* cited by examiner

METHOD, APPARATUS, AND DEVICE FOR IMAGE CAPTURE, AND STORAGE MEDIUM

CROSS REFERENCE TO RELATED APPLICATIONS

This application is a 35 U.S.C. 371 national stage filing of PCT Application No. PCT/CN2019/0103656 filed on Aug. 30, 2019, which claims priority to Chinese Patent Application No. 201910506435.6 filed with the CNIPA on Jun. 12, 2019, the disclosures of which are incorporated herein by reference in their entireties.

This application claims priority to Chinese Patent Application No. 201910506435.6 filed with the CNIPA on Jun. 12, 2019, the disclosure of which is incorporated herein by reference in its entirety.

TECHNICAL FIELD

The present application relates to the field of computer software application and, for example, to a method, apparatus and device for image capturing and a storage medium.

BACKGROUND

Photographing becomes increasingly popular with the improvement of people's living standards and the development of electronic devices. However, people are at different levels of photographing. To enable people at different levels of photographing to take high-quality photos, cameras are provided with the smart capturing mode. In the related art, the smart capturing mode merely detects current environmental parameters for capturing and makes an automatic adjustment to the environmental parameters so as to help non-professionals capture professional photos. The automatically-adjusted parameters are usually limited to aperture, shutter speed, etc. The degree of intellectualization is relatively low. On this basis, the technology of automatically tracking a target for capturing is developed.

The automatic target tracking for capturing is applied in various scenes. The function of automatic tracking for capturing is implemented by positioning the target through a bounding box and then controlling the movement of the camera based on the "center control" method. However, this method has many limitations in portrait capturing. Portrait capturing is relatively complicated. Under different postures, the effect obtained by the related "center control" method by virtue of the bounding box is quite different from the actual expectation effect of people. The related "center control" method by virtue of the bounding box is only applicable to special situations where very few targets exist in an image.

SUMMARY

The present application provides a method, apparatus and device for image capturing and a storage medium that automatically control the turning of a camera based on pixel-level visual features of an image and thus improve the capturing effect.

The present application provides a method for image capturing. The method for image capturing includes acquiring the bounding box of a lens tracking target in an image to be captured; using a pre-trained reference model to predict the first reference position of the image to be captured; and determining a lens movement offset based on the position of each pixel in the bounding box and the first reference position.

The present application provides an apparatus for image capturing. The apparatus for image capturing includes a bounding box acquisition module, a reference position prediction module, and a lens offset determination module.

The bounding box acquisition module is configured to acquire the bounding box of a lens tracking target in an image to be captured.

The reference position prediction module is configured to use a pre-trained reference model to predict the first reference position of the image to be captured.

The lens offset determination module is configured to determine a lens movement offset based on the position of each pixel in the bounding box and the first reference position.

The present application provides a device for image capturing. The device for image capturing includes a memory and a processor. The memory stores computer a program executable on the processor. The processor executes the computer program to perform the preceding method for image capturing.

The present application provides a computer-readable storage medium storing a computer program. The computer program includes program instructions. When the program instructions are executed, the preceding method for image capturing is performed.

DETAILED DESCRIPTION

Figure 1:
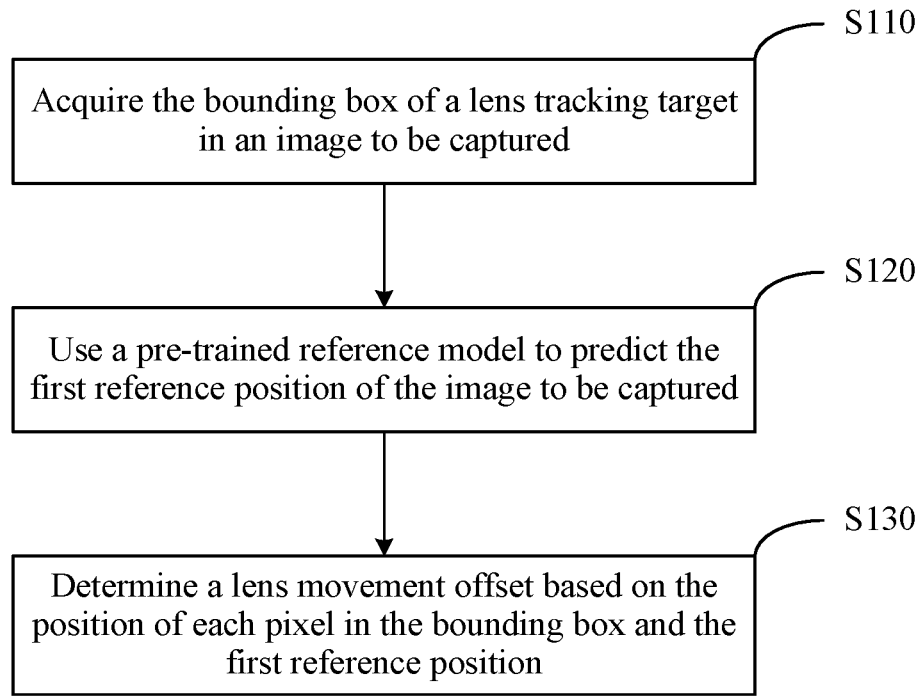
FIG. 1 is a flowchart of a method for image capturing according to embodiment one of the present application.

Solutions in embodiments of the present application are described hereinafter in conjunction with drawings in embodiments of the present application. The embodiments described herein are part, not all, of embodiments of the present application. The embodiments are intended to illustrate and not to limit the present application.

Unless otherwise defined, all technical and scientific terms used herein have the same meanings as the terms commonly understood by those skilled in the art. Terms used in the description of the present application are only used to describe the objects of the embodiments and are not intended to limit the present application. The term "and/or" used herein includes any or all combinations of one or more listed associated items.

Moreover, terms like "first" and "second" are used for describing a variety of directions, actions, steps, elements, etc. However, the directions, actions, steps, or elements are not limited by these terms. These terms are merely used for distinguishing one direction, action, step, or element from another direction, action, step, or element. For example, without departing from the scope of the present application, a first speed difference value may be referred to as a second speed difference value. Similarly, a second speed value difference may be referred to as a first speed difference value. The first speed difference value and the second speed difference values are both difference values, but are not the same different value. Terms like "first" and "second" are not to be construed as indicating or implying relative importance or implicitly indicating the number of technical features as indicated. Thus, a feature defined as a "first" feature or a "second" feature may explicitly or implicitly include one or more of such a feature. As used herein, the term "plurality" is defined as at least two, for example, two or three, unless otherwise specified and limited. In the case where one portion is described as being "secured" to another portion, it may be directly on the particular portion or intervening portions may be on the particular portion. In the case where a portion is described as being "connected to" another portion, it may be directly connected to the particular portion or intervening portions may be connected to the particular portion. The terms "vertical", "horizontal", "left", "right" and the like, as used herein, are only used for an illustrative purpose and are not the only embodiment.

Some exemplary embodiments are described as processes or methods depicted in flowcharts. Although the flowcharts describe the steps as sequentially processed, many steps herein may be performed concurrently, coincidently, or simultaneously. Additionally, the sequence of the steps may be rearranged. Each of the processes may be terminated when the operations are completed, but may further have additional steps not included in the drawings. Each of the processes may correspond to one of a method, a function, a procedure, a subroutine, a subprogram, etc.

Embodiment One

Referring to FIG. 1, this embodiment provides a method for image capturing. The method includes the steps below.

In S110, the bounding box of a lens tracking target in an image to be captured is acquired.

In the case of image capturing, to achieve a better composition effect, a target to be captured or a lens tracking target is usually placed in the center of the image as much as possible. Accordingly, before adjusting lens movement, the position of the lens tracking target in the image needs to be determined. The lens tracking target herein refers to a main capturing target that needs to be kept in the lens all along, for example, a person, a pet, and another photographing material. In this embodiment, the bounding box is used to determine the position of the lens tracking target. The bounding box refers to the area range corresponding to the picture where the lens tracking object appears in the image to be captured. In one embodiment, the bounding box has a rectangular outer frame shape that is long in the longitudinal direction or the transverse direction. In this embodiment, the size of the bounding box and the position of the bounding box depend on the size of the lens tracking target in the image captured by the lens. In one embodiment, the bounding box may be determined based on the visual tracking method in the related art.

In S120, a pre-trained reference model is used to predict the first reference position of the image to be captured.

In the related art, the target is usually positioned to the center of the image by using the "center control" method. However, this method does not take into consideration the effect of different postures of the tracked target on composition. For example, when a standing portrait is captured, the center of the standing portrait is placed in the center of the image through the "center control" method. However, the upper part of a human body closer to the center of the image may achieve a better composition effect. Accordingly, in this embodiment, the pre-trained reference model is used to predict the first reference position of the image to be captured.

The reference model is trained based on a deep convolutional neural network (CNN). The first reference position is for predicting an optimal composition position of the lens tracking target in the image. The optimal composition position is the position of the lens tracking target in the image captured by a photographer through statistical analysis according to plenty of images that are captured by photographers and contain the lens tracking target. The optimal composition position is determined by the reference model according to the information of the lens tracking target in the image. The information of the lens tracking target includes the size of the bounding box of the lens tracking target, the position of the bounding box of the lens tracking target, and one or more postures of the lens tracking target.

In S130, a lens movement offset is determined based on the position of each pixel in the bounding box and the first reference position.

After the first reference position is determined, the composition predicting the position of the bounding box is determined. The movement offset required by the lens may be calculated by combining the initial position of the bounding box. The related "center control" method for the bounding box merely takes the center point of the bounding box for calculation. The related "center control" method is used to calculate the movement offset required by the lens when the center point of the bounding box is moved to the center of the image. This calculation method works well in the case where the bounding box is small enough. However, in the actual capturing, the size of the bounding box is uncertain. Moreover, for the composition effect, the proportion of the lens tracking target in the image cannot be excessively small. That is, the proportion of the bounding box in the image cannot be excessively small. Accordingly, in order that a more accurate lens offset is obtained, in this embodiment, based on the first reference position predicted by the reference model, the lens movement offset is calculated using the position of each pixel in the bounding box based on pixel-level visual features of the image.

Figure 2:
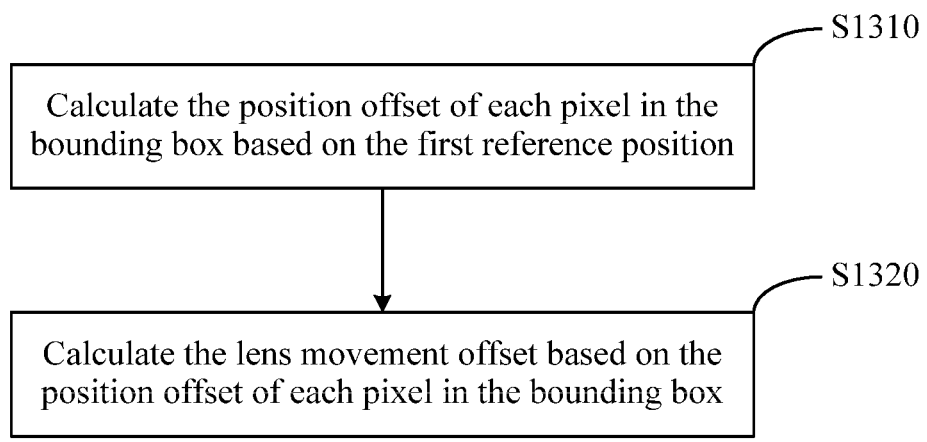
FIG. 2 is a sub-flowchart of a method for image capturing according to embodiment one of the present application.

In some embodiments, as shown in FIG. 2, step S130 includes steps S1310 to S1320.

In S1310, the position offset of each pixel in the bounding box is calculated based on the first reference position.

(x, y) is defined as a pixel normalization coordinate. x denotes a coordinate in the horizontal direction. y denotes a coordinate in the vertical direction.

XT denotes a horizontal coordinate image of the reference position. YT denotes a vertical coordinate image of the reference position. XT and YT are predicted by the reference model.

DX denotes a horizontal offset image. DY denotes a vertical offset image. DX and DY are calculated by subsequent methods.

In one embodiment, the position offset of each pixel in the bounding box is calculated based on the first reference position by using formulas $$\begin{cases} DX(x, y) = XT(x, y) - x \\ DY(x, y) = YT(x, y) - y \end{cases}.$$

In the preceding formulas, DX(x, y) denotes the horizontal offset of each pixel in the bounding box; XT(x, y) denotes the horizontal position of each pixel in the bounding box located at the first reference position, that is, the horizontal coordinate of each pixel in the bounding box in the image predicted by the reference model; DY(x, y) denotes the vertical offset of each pixel in the bounding box; YT(x, y) denotes the vertical position of each pixel in the bounding box located at the first reference position, that is, the vertical coordinate of each pixel in the bounding box in the image predicted by the reference model; x denotes the horizontal position of each pixel in the bounding box, which may also be understood as the horizontal coordinate of the initial position of each pixel in the bounding box; y denotes the vertical position of each pixel in the bounding box, which may also be understood as the vertical coordinate of the initial position of each pixel in the bounding box.

In this embodiment, according to the calculation formulas in S1310, the coordinate difference between the position of each pixel in the bounding box and the initial position of each pixel in the bounding box may be calculated in the case where the bounding box is located at the first reference position. Accordingly, the position offset of each pixel in the bounding box is represented by comparing the image predicted by the reference model with the image captured before the lens is offset.

In S1320, the lens movement offset is calculated based on the position offset of each pixel in the bounding box.

In one embodiment, based on the position offset of each pixel in the bounding box, the lens movement offset d required for obtaining the image predicted by the reference model is calculated by using formulas $$\begin{cases} d_x = \dfrac{\sum_{(x,y)\in\Theta} DX(x, y)}{\sum_{(x,y)\in\Theta} 1} \\ d_y = \dfrac{\sum_{(x,y)\in\Theta} Dy(x, y)}{\sum_{(x,y)\in\Theta} 1} \end{cases}.$$

In the preceding formulas, $d_x$ denotes the horizontal movement offset of the lens; $d_y$ denotes the vertical movement offset of the lens; $(x, y)\in\Theta$ denotes that a pixel $(x, y)$ is in the bounding box $\Theta$; $\sum_{(x,y)\in\Theta} 1$ denotes the total number of pixels in the bounding box $\Theta$. The lens movement offset satisfies that $d=(d_x, d_y)$.

This embodiment provides a method of image capturing. The first reference position with a better composition effect is obtained by using the reference model trained by the deep convolutional neural network to predict the image to be captured. Based on pixel-level visual features of the image and the first reference position, the position offset of each pixel is calculated and thus the lens movement offset is obtained. The technical solutions of this embodiment can automatically adapt to different postures and different positions of a capturing target, predict the reference position of the target and control the camera to move so as to achieve a better composition effect.

The capturing effect is improved with no need for manually controlling the turning of the camera. Accordingly, the capturing experience of users is enhanced.

The method of image capturing provided in the present application uses the bounding box to determine the position of the lens tracking target in the image to be captured. The first reference position of the image to be captured is predicted by using the reference model that is trained based on the deep convolutional neural network and can simulate the composition ideas of photographers. Based on the first reference position and the bounding box that is used to determine the position of the tracking target in the image to be captured, the pixel-level calculation method is used to calculate the lens movement offset required when the tracking target is located at the first reference position. Accordingly, pixel-level visual features based on the image are implemented. The turning of the camera is controlled automatically so that capturing is performed by automatically adapting to the change in target postures and the change in capture angels of the camera. Thus the capturing effect is improved and the capturing experience of users is enhanced.

Embodiment Two

Figure 3:
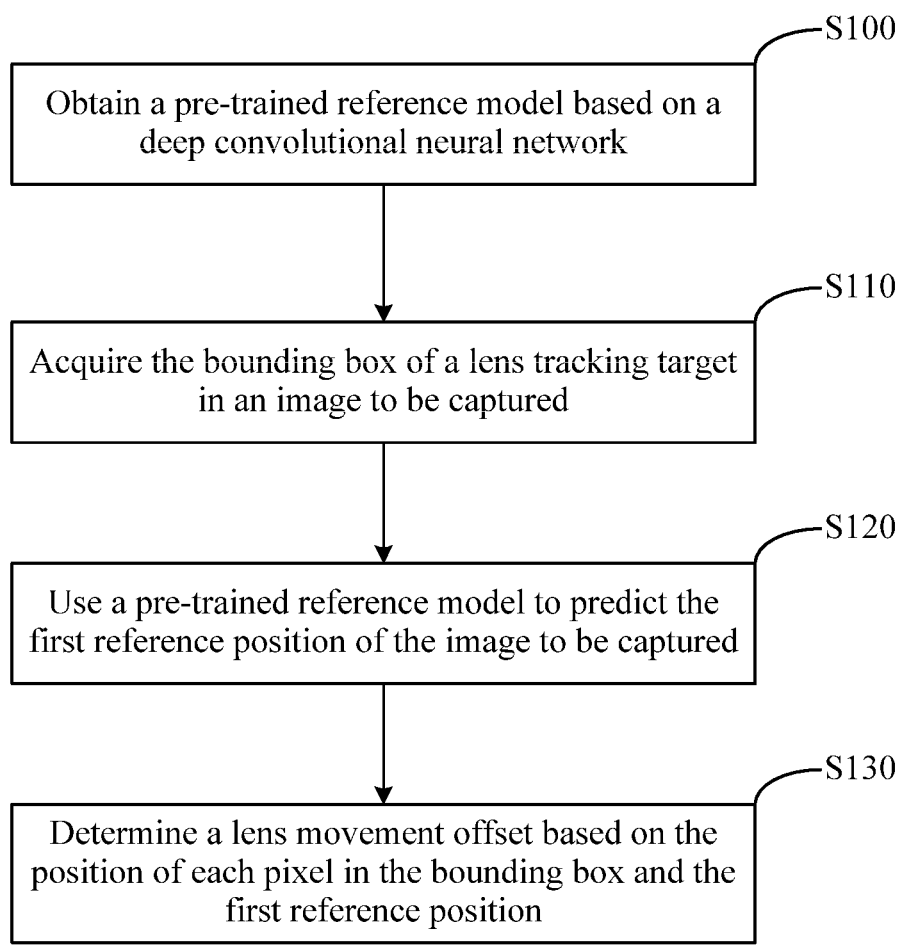
FIG. 3 is a flowchart of another method for image capturing according to embodiment two of the present application.

FIG. 3 is a flowchart of another method for image capturing according to embodiment two of the present application. This embodiment is implemented based on embodiment one. As shown in FIG. 3, the steps below are included before step S110.

In S100, a pre-trained reference model is obtained based on a deep convolutional neural network.

Figure 4:
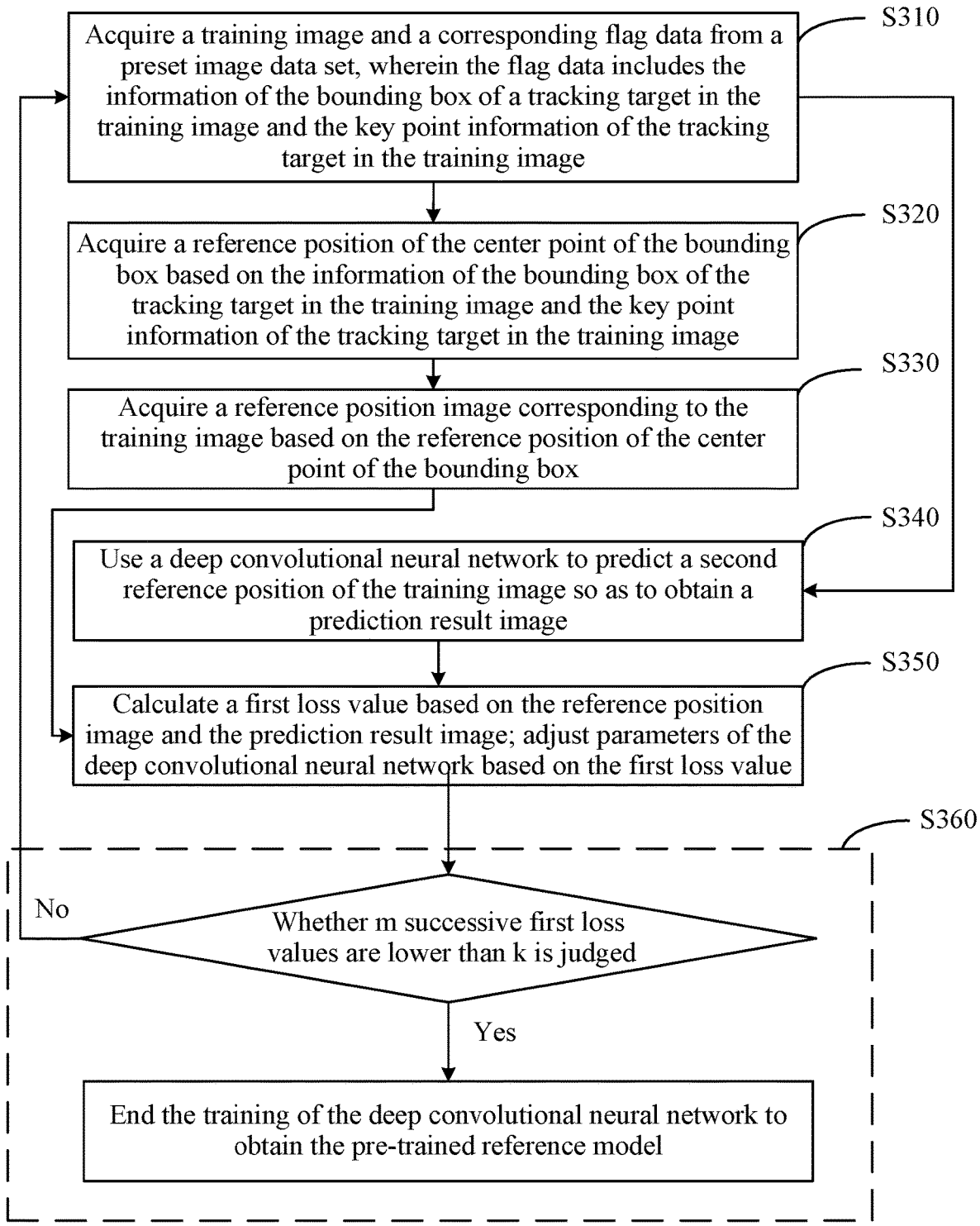
FIG. 4 is a flowchart illustrating the training of a reference model according to embodiment two of the present application.

In some embodiments, as shown in FIG. 4, step S100 in which the pre-trained reference model is obtained based on the deep convolutional neural network (that is, the training process of the reference model) includes steps S310 to S360.

In S310, a training image and the corresponding flag data are acquired from a preset image data set. The flag data includes the information of the bounding box of a tracking target in the training image and the key point information of the tracking target in the training image.

In this embodiment, a plurality of training images are preset in the image data set. The types of the training images may be selected according to different capturing targets. In this embodiment, portrait capturing is taken as an example. All the training images collected in the image data set are training images including a portrait. These training images may cover a plurality of main scenes, for example, indoors, by the seaside and on the mountain, as well as a plurality of postures, for example, running, meditation, lying flat, and dancing.

In the image data set, each training image has the corresponding flag data. In this embodiment, the flag data includes the information of the bounding box of a tracking target in the training image and the key point information of the tracking target in the training image. The information of the bounding box includes the position of a bounding box and the size of the bounding box. In this embodiment, 17 joint points of a human body are selected exemplarily as key points. The coordinate information corresponding to each joint point is flagged as the key point information. Each joint point is flagged as (xi,yi,si). i is an integer from 1 to 17 and denotes key point i. xi denotes the horizontal coordinate of key point i. yi denotes the vertical coordinate of key point i. The case where si is equal to 0 indicates that the key point does not exist (the corresponding xi and the corresponding yi are both 0). The case where si is equal to 1 indicates that the key point exists. When i is 1 to 17, it corresponds to the following key points respectively: 1—head, 2—left eye, 3—right eye, 4—nose, 5—throat, 6—left shoulder, 7—left elbow, 8—left wrist, 9—right shoulder, 10—right elbow, 11—right wrist, 12—left hip, 13—left knee, 14—left ankle, 15—right hip, 16—right knee, and 17—right ankle.

In S320, a reference position of the center point of the bounding box is acquired based on the information of the bounding box of the tracking target in the training image and the key point information of the tracking target in the training image.

In the related "center control" method, the center point of the bounding box of the target is controlled to move to the center of the image so as to complete composition. With a simple calculation process, this method does not take into consideration the effect of different postures of the target on composition. Thus the capturing effect is greatly different from the actual expectation. Accordingly, in the capturing method provided in this embodiment, the difference of composition requirements for different postures of the tracking target is sufficiently considered in the training of the reference model. Based on the difference in the flagged key point information of the tracking target in step S310, different postures of the tracking target may be distinguished. Based on the information of the bounding box of the tracking target and the key point information of the tracking target, a reference position of the center point of the bounding box is calculated. Moreover, the composition control ability of photographers can be sufficiently simulated so that the composition effect is better.

Figure 5:
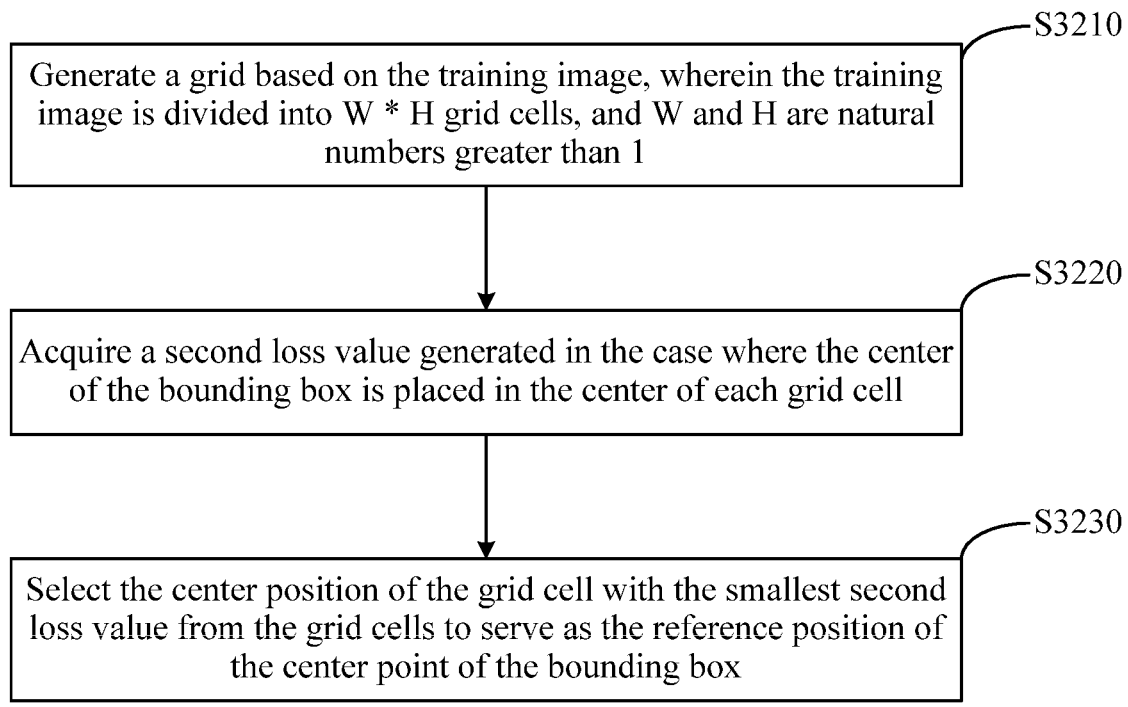
FIG. 5 is a sub-flowchart illustrating the training of a reference model according to embodiment two of the present application.

In some embodiments, as shown in FIG. 5, step S320 includes steps S3210 to S3230.

In S3210, a grid is generated based on the training image. The training image is divided into W*H grid cells. W and H are natural numbers greater than 1. Each grid cell provides a position choice for the subsequent calculation of the composition position of the bounding box. The numerical values of W and H may be adjusted according to actual requirements.

In S3220, a second loss value generated in the case where the center of the bounding box is placed in the center of each grid cell is acquired.

The calculation process of the second loss value is described below.

The horizontal coordinate range of the image and the vertical coordinate range of the image are both [0, 1].

In (1), a set of reference points are defined below.

$$\Psi = \left\{ \left(\frac{1}{3}, \frac{1}{3}\right), \left(\frac{1}{3}, \frac{1}{2}\right), \left(\frac{1}{3}, \frac{2}{3}\right), \left(\frac{2}{3}, \frac{1}{3}\right), \left(\frac{2}{3}, \frac{1}{2}\right), \left(\frac{2}{3}, \frac{2}{3}\right), \left(\frac{1}{2}, \frac{1}{3}\right), \left(\frac{1}{2}, \frac{1}{2}\right), \left(\frac{1}{2}, \frac{2}{3}\right) \right\}.$$

In (2), a set of reference lines are defined below.

$$\Gamma = \left\{ x = \frac{1}{3}, x = \frac{1}{2}, x = \frac{2}{3}, y = \frac{1}{3}, y = \frac{1}{2}, y = \frac{2}{3} \right\}.$$

The arrangement of reference points and reference lines may be adjusted according to different composition demands. In this embodiment, through the preceding reference points and reference lines, the area defined by the horizontal coordinate range $$\left[\frac{1}{3}, \frac{2}{3}\right]$$

and the vertical coordinate range $$\left[\frac{1}{3}, \frac{2}{3}\right]$$

is determined as an optimal composition area of the tracking target.

In (3), a key point set of the tracking target and a corresponding weight parameter set are defined based on the key point information of the tracking target as below.

$$P=\{p_i\}, i=1,2,\ldots,17;$$

$$W_P=\{w_{pi}\}, i=1,2,\ldots,17.$$

In (4), key line segments are defined according to the key point information of the tracking target. The key line segments are used to supplement the posture information of the tracking target. Since postures reflected by the key points have some errors in a certain situation, the postures of the tracking target may be reflected more clearly by combining the key line segments based on the key points, exemplarily as below.

L1: nose→{the midpoint between the left hip and the right hip};
L2: left shoulder→left elbow;
L3: left elbow→left wrist;
L4: right shoulder→right elbow;
L5: right elbow→right wrist;
L6: left hip→left knee;
L7: left knee→left ankle;
L8: right hip→right knee;
L9: right knee→right ankle.

In (5), a key line segment set of the tracking target and a corresponding weight parameter set are defined based on the preceding 9 key line segments as below.

$$L=\{l_j\}, j=1,2,\ldots,9;$$

$$W_l=\{w_{lj}\}, j=1,2,\ldots,9.$$

When the postures of the tracking target are different, the positions of the key points of the target change. The lengths and positions of the preceding key line segments change correspondingly.

In (6), the calculation formula of the distance between a key point and a reference point is described below.

$$d_p = |p_i - p_j| = \sqrt{(x_{pi} - x_{pj})^2 + (y_{pi} - y_{pj})^2}.$$

In this embodiment, in the calculation formula of the distance between a key point and a reference point, $p_i$ and $p_j$ denote two different points. $x_{pi}$ and $y_{pi}$ denote the horizontal coordinate of the point $p_i$ and the vertical coordinate of the point $p_i$ respectively. $x_{pj}$ and $y_{pj}$ denote the horizontal coordinate of the point $p_j$ and the vertical coordinate of the point $p_j$ respectively.

In (7), the calculation formula of the distance between a key line and a reference line is described below.

$$d_l = \begin{cases} |x_c - a|, & x = a \\ |y_c - a|, & y = a \end{cases}.$$

In the calculation formula of the distance between a key line and a reference line, $(x_c, y_c)$ denotes the midpoint of the line segment 1. A vertical line is denoted in which x=a. A horizontal line is denoted in which y=a.

In (8), the second loss value $D_{xy}$ is calculated in a case where the center of the bounding box is placed in a center (x, y) of each grid cell as below.

$$D_p = \Sigma_{i=1}^{17} w_{pi} d_i = \Sigma_{i=1}^{17} w_{pi} \cdot \min\{|p_i - \varphi_j|, p_i \in P_{xy}, \varphi_j \in \Psi, w_{pi} \in W_p\};$$

$$D_l = \Sigma_{i=1}^{9} w_{li} d_i = \Sigma_{i=1}^{9} w_{li} \cdot \min\{|l_i - \gamma_j|, l_i \in L_{xy}, \gamma_j \in \Gamma, w_{li} \in W_l\};$$

$$D_{xy} = D_p + D_l.$$

In the preceding formulas, the normalization of the key points is denoted in which $P_{xy} = P \rightarrow (x, y)$. The normalization of the key line segments is denoted in which $L_{xy} = L \rightarrow (x, y)$.

In one embodiment, $P_{xy} = (x/W, y/H)$. $L_{xy}$ denotes a segment of two points after normalization.

The second loss value may reflect the degree of coincidence between the tracking target and the user-defined optimal composition area when the bounding box is placed in different positions. The smaller the second loss value, the closer the tracking target is to the user-defined optimal composition area.

In S3230, the center position of the grid cell with the smallest second loss value is selected from the grid cells to serve as the reference position of the center point of the bounding box.

When $D_{x_t y_t} = \min D_{xy}$, $(x_t, y_t)$ is selected as the reference position of the center point of the bounding box. In the case where the user-defined grid cells, reference points, and reference lines are unchanged, the relationship between $(x_t, y_t)$ and the corresponding key point information (including the key line segments) is determined, that is, the mapping relationship satisfies that $(x_t, y_t) = O(P)$. P denotes the key point information of the capturing target tracked by the lens.

In an alternative embodiment, the user-defined grid cells, reference points, and reference lines may be adjusted according to different requirements for image accuracy. In one embodiment, the key points of the tracking target and the relationship between the key line segments and the key points may be user-defined. For example, in the case of relatively high demand for accuracy, W and H may be increased, that is, the number of image segmentation grid cells is increased.

In S330, a reference position image corresponding to the training image is acquired based on the reference position of the center point of the bounding box.

In the case where a plurality of target portraits exist in the training image, the reference position image corresponding to the training image needs to be acquired based on the reference position of the center point of the bounding box of each tracking target, the initial position of the center point of the bounding box of each tracking target, and the number of tracking targets.

In (1), a reference position set of the center points of the bounding boxes of all the tracking targets are defined below.

$$\Theta = \{O(P_i)\} = \{(x_{ti}, y_{ti})\}.$$

In (2), a coordinate of the initial position of the center point of the bounding box of each tracking target is defined below.

$$\Delta = \{(x_{ci}, y_{ci})\}.$$

In (3), the calculation formulas of the reference position of each pixel in the training image are described below.

$$\begin{cases} X_{TG}(x, y) = \dfrac{\sum_{\Theta, \Delta} (x + x_{ti} - x_{ci})}{\sum_{\Theta, \Delta} 1} \\ Y_{TG}(x, y) = \dfrac{\sum_{\Theta, \Delta} (y + y_{ti} - y_{ci})}{\sum_{\Theta, \Delta} 1} \end{cases} \quad (1)$$

In formulas (1), (x, y) denotes the pixel normalization coordinate. $\Sigma_{\Theta, \Delta} 1$ denotes the number of tracking targets in the training image. $X_{TG}(x, y)$ denotes the horizontal coordinate of the reference position of each pixel. $Y_{TG}(x, y)$ denotes the vertical coordinate of the reference position of each pixel. $x_{ti}$ and $x_{ci}$ denote the horizontal coordinate of the reference position of the center point of the bounding box of each tracking target and the horizontal coordinate of the initial position of the center point of the bounding box of each tracking target respectively. $y_{ti}$ and $y_{ci}$ denotes the vertical coordinate of the reference position of the center point of the bounding box of each tracking target and the vertical coordinate of the initial position of the center point of the bounding box of each tracking target. The reference position image of the training image is obtained after the reference position coordinate of each pixel is determined.

Compared with the image obtained through the related "center control" method, the reference position image takes into more sufficient consideration the composition requirements for different postures of the target so that the composition effect is more precise and reasonable.

In S340, the deep convolutional neural network is used to predict a second reference position of the training image so as to obtain a prediction result image.

The initial model of the deep convolutional neural network is used to predict the training image so that the second reference position of the tracking target in the image is obtained. Accordingly, a prediction result image is obtained. In the prediction result image, $X_T(x, y)$ and $Y_T(x, y)$ denote the horizontal coordinate of each pixel and the vertical coordinate of each pixel respectively.

In S350, a first loss value is calculated based on the reference position image and the prediction result image; parameters of the deep convolutional neural network are adjusted based on the first loss value.

The first loss value uses the Euclidean distance loss and is calculated by formula (2) based on the previously obtained reference position image and prediction result image:

$$L = \Sigma_{x,y}(X_{TG}(x,y) - X_T(x,y))^2 + \Sigma_{x,y}(Y_{TG}(x,y) - Y_T(x,y))^2 \quad (2)$$

In formula (2), $X_{TG}(x, y)$ and $X_{TG}(x, y)$ are obtained by formula (1); $X_T(x, y)$ and $Y_T(x, y)$ are obtained by the prediction result image. The reference position image is an image in which the composition effect is expected to be implemented. The first loss value indicates the deviation between the prediction result image and the reference position image. On the basis that the first loss value performs backpropagation for the deep convolutional neural network, the parameters of the deep convolutional neural network are adjusted so that the prediction result image is closer to the reference position image.

In S360, steps S310 to S350 are performed sequentially for a plurality of training images in the image data set until the first loss value no longer drops; the training of the deep convolutional neural network is ended to obtain the pre-trained reference model.

The parameters of the deep convolutional neural network are adjusted by the first loss value so that different first loss values are obtained. The case where the first loss value continues to drop indicates that the prediction result image is increasingly close to the reference position image. The convolutional neural networks are adjusted continually. The case where the first loss value no longer drops finally may be considered that the prediction result image is the closest to the reference position image. In this case, the expected model of the deep convolutional neural network may be used as the trained reference model.

Since certain differences may exist between first loss values obtained from different training images, it is impossible to ensure that the first loss value calculated through each of the training images can reach the lowest simultaneously. Herein the case where a first loss value no longer drops is an expression that the first loss value tends to be stable and meets the expected requirement. Exemplarily, the expected requirement for the first loss value is user-defined as that the first loss value is lower than k. When at least m successive first loss values obtained after a plurality of training by using a plurality of training images are always lower than k, the first loss value is considered no longer dropping.

This embodiment provides a training process of the pre-trained reference model used in embodiment one. Based on the key point information of a tracking target, a more reasonable composition mode is provided so that the composition effect of the reference image is better. On the basis that the first loss value calculated through the reference image and the deep convolutional neural network perform backpropagation for the deep convolutional neural network, the trained reference model can adapt to different postures of the target and predict a prediction image with a more reasonable composition.

Embodiment Three

Figure 6:
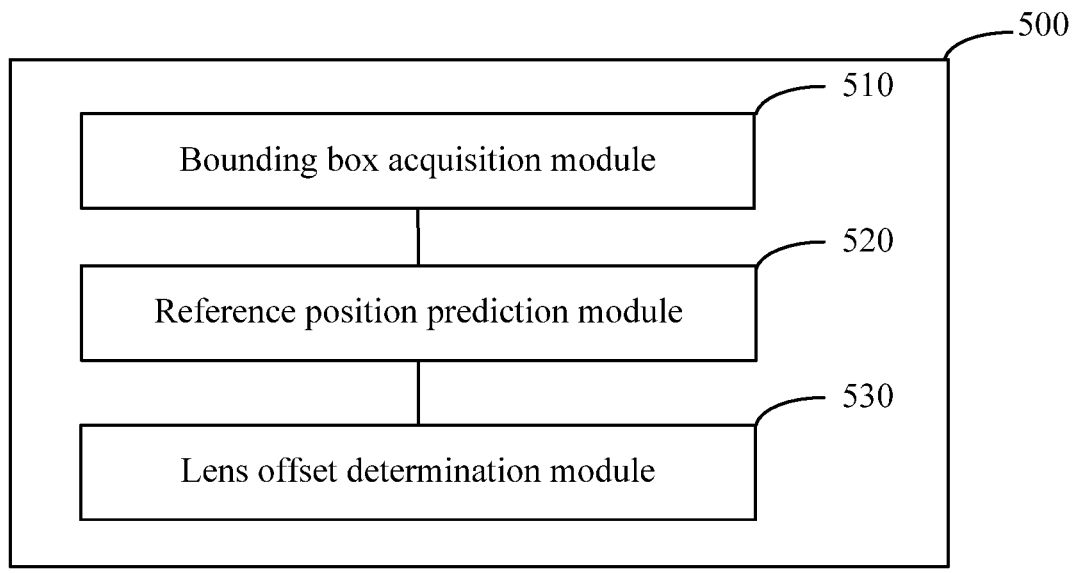
FIG. 6 is a diagram illustrating the structure of an apparatus for image capturing according to embodiment three of the present application.

As shown in FIG. 6, this embodiment provides an apparatus 500 for image capturing. The apparatus 500 for image capturing includes a bounding box acquisition module 510, a reference position prediction module 520, and a lens offset determination module 530. The bounding box acquisition module 510 is configured to acquire the bounding box of a lens tracking target in an image to be captured. The reference position prediction module 520 is configured to use a pre-trained reference model to predict the first reference position of the image to be captured. The lens offset determination module 530 is configured to determine a lens movement offset based on the position of each pixel in the bounding box and the first reference position.

In this embodiment, the bounding box acquisition module 510 is configured to acquire a plurality of bounding boxes corresponding to the lens tracking targets based on the number of the lens tracking targets in the image to be captured.

Figure 7:
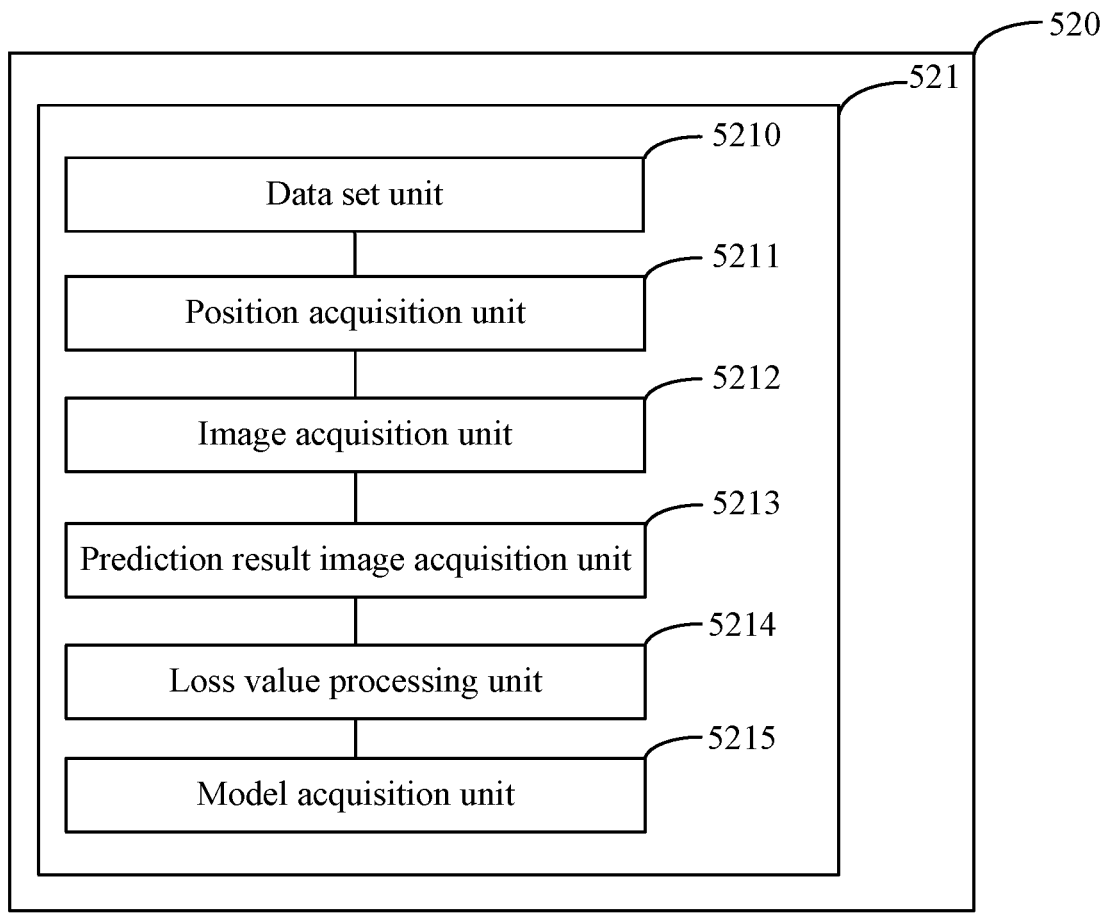
FIG. 7 is a diagram illustrating the structure of a training sub-module of an apparatus for image capturing according to embodiment three of the present application.

In this embodiment, as shown in FIG. 7, the reference position prediction module 520 also includes a model training sub-module 521 configured to obtain a trained reference model based on a deep convolutional neural network.

As shown in FIG. 7, the model training sub-module 521 includes a data set unit 5210, a position acquisition unit 5211, an image acquisition unit 5212, a prediction result image acquisition unit 5213, a loss value processing unit 5214, and a model acquisition unit 5215. The data set unit 5210 is configured to acquire a training image and the corresponding flag data from a preset image data set. The flag data includes the information of the bounding box of a tracking target in the training image and the key point information of the tracking target in the training image. The position acquisition unit 5211 is configured to acquire a reference position of the center point of a bounding box based on the information of the bounding box of the tracking target and the key point information of the tracking target. The image acquisition unit 5212 is configured to acquire a reference position image corresponding to the training image based on the reference position of the center point of the bounding box. In one embodiment, the image acquisition unit 5212 is configured to acquire a reference position image corresponding to the training image based on the reference position of the center point of the bounding box of each tracking target, the initial position of the center point of the bounding box of each tracking target, and the number of tracking targets. The prediction result image acquisition unit 5213 is configured to use the deep convolutional neural network to predict a second reference position of the training image so as to obtain a prediction result image. The loss value processing unit 5214 is configured to calculate a first loss value according to the reference position image and the prediction result image and adjust the parameters of the deep convolutional neural network according to the first loss value. The model acquisition unit 5215 is configured to end the training of the deep convolutional neural network to obtain the trained reference model.

In one embodiment, the first loss value is obtained by using the formula $L=\Sigma_{x,y}(X_{TG}(x, y)-X_T(x, y))^2+\Sigma_{x,y}(Y_{TG}(x, y)-Y_T(x, y))^2$.

In the preceding formula, $X_{TG}(, y)$ denotes the horizontal position of each pixel in the bounding box and is calculated based on the reference position of the center point of the bounding box. $X_T(, y)$ denotes the horizontal position of each pixel in the bounding box and is predicted by the deep convolutional neural network. $Y_{TG}(x, y)$ denotes the vertical position of each pixel in the bounding box and is calculated based on the reference position of the center point of the bounding box. $Y_T(x, y)$ denotes the vertical position of each pixel in the bounding box and is predicted by the deep convolutional neural network.

Figure 8:
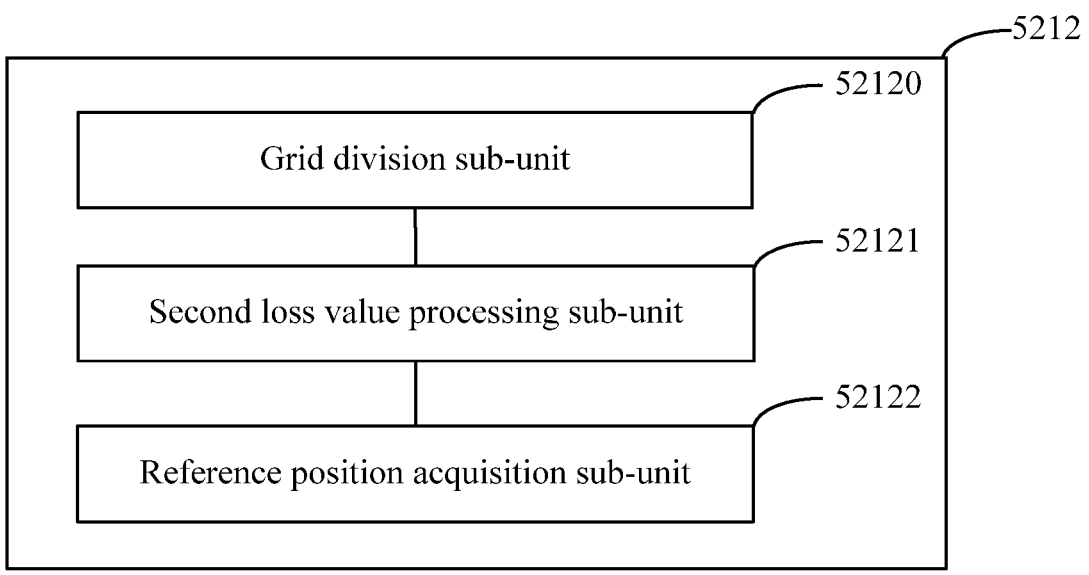
FIG. 8 is a diagram illustrating the structure of a position acquisition unit of an apparatus for image capturing according to embodiment three of the present application.

In one embodiment, as shown in FIG. 8, the image acquisition unit 5212 includes a grid division sub-unit 52120, a second loss value processing sub-unit 52121, and a reference position acquisition sub-unit 52122. The grid division sub-unit 52120 is configured to generate a grid based on the training image. The training image is divided into W*H grid cells. W and H are natural numbers greater than 1. The second loss value processing sub-unit 52121 is configured to acquire a second loss value in the case where the center of the bounding box is placed in the center of each grid cell. The reference position acquisition sub-unit 52122 is configured to select the center position of the grid cell with the smallest second loss value to serve as the reference position of the center point of the bounding box.

Figure 9:
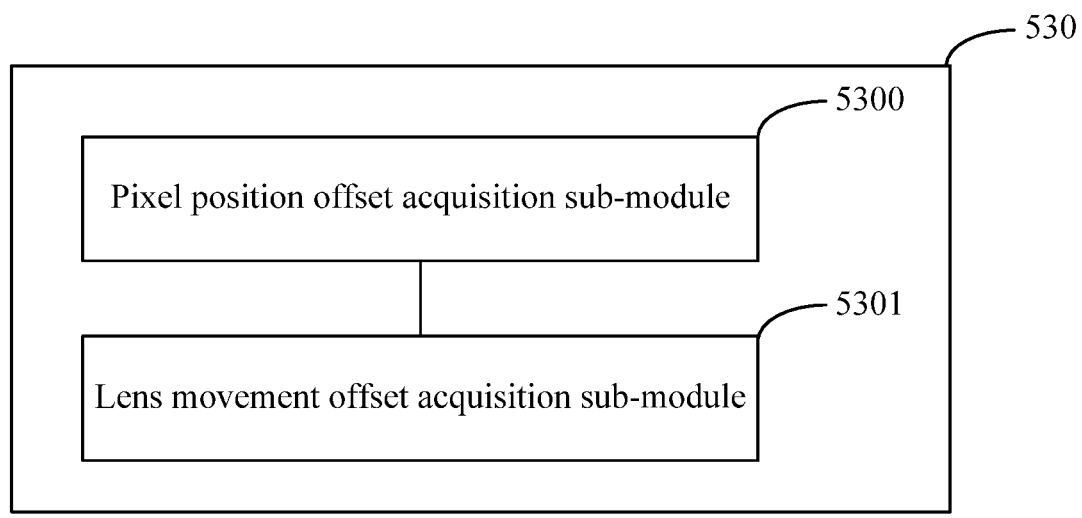
FIG. 9 is a diagram illustrating the structure of a lens offset determination module of an apparatus for image capturing according to embodiment three of the present application.

In one embodiment, as shown in FIG. 9, the lens offset determination module 530 includes a pixel position offset acquisition sub-module 5300 and a lens movement offset acquisition sub-module 5301. The pixel position offset acquisition sub-module 5300 is configured to calculate the position offset of each pixel in the bounding box according to the first reference position. The lens movement offset acquisition sub-module 5301 is configured to acquire the lens movement offset according to the position offset of each pixel in the bounding box.

In one embodiment, the pixel position offset acquisition sub-module 5300 is configured to calculate the position offset of each pixel in the bounding box according to the first reference position by using formulas $$\begin{cases} DX(x, y) = XT(x, y) - x \\ DY(x, y) = YT(x, y) - y \end{cases}.$$

In the preceding formulas, DX(x, y) denotes the horizontal offset of each pixel in the bounding box; XT(x, y) denotes the horizontal position of each pixel in the bounding box located at the first reference position; x denotes the horizontal position of each pixel in the bounding box; DY(x, y) denotes the vertical offset of each pixel in the bounding box; YT(x, y) denotes the vertical position of each pixel in the bounding box located at the first reference position; y denotes the vertical position of each pixel in the bounding box.

In one embodiment, the lens movement offset acquisition sub-module 5301 is configured to calculate the lens movement offset d according to the position offset of each pixel in the bounding box by using formulas $$\begin{cases} d_x = \dfrac{\sum_{(x,y)\in\Theta} DX(x, y)}{\sum_{(x,y)\in\Theta} 1} \\ d_y = \dfrac{\sum_{(x,y)\in\Theta} DY(x, y)}{\sum_{(x,y)\in\Theta} 1} \end{cases}.$$

In the preceding formulas, $d=(d_x, d_y)$; $d_x$ denotes the horizontal movement offset of the lens; $d_y$ denotes the vertical movement offset of the lens; $(x, y)\in\Theta$ denotes that a pixel $(x, y)$ is in the bounding box $\Theta$; $\sum_{(x,y)\in\Theta} 1$ denotes the total number of pixels in the bounding box $\Theta$.

This embodiment provides an apparatus for image capturing so that capturing is performed by automatically adapting to the change in target postures and the change in capture angels of the camera. Thus the capturing effect is improved and the capturing experience of users is enhanced.

The apparatus for image capturing provided by this embodiment of the present application can perform the method for image capturing provided by the preceding embodiments of the present application and has functional modules and beneficial effects corresponding to the performing of the method.

Embodiment Four

Figure 10:
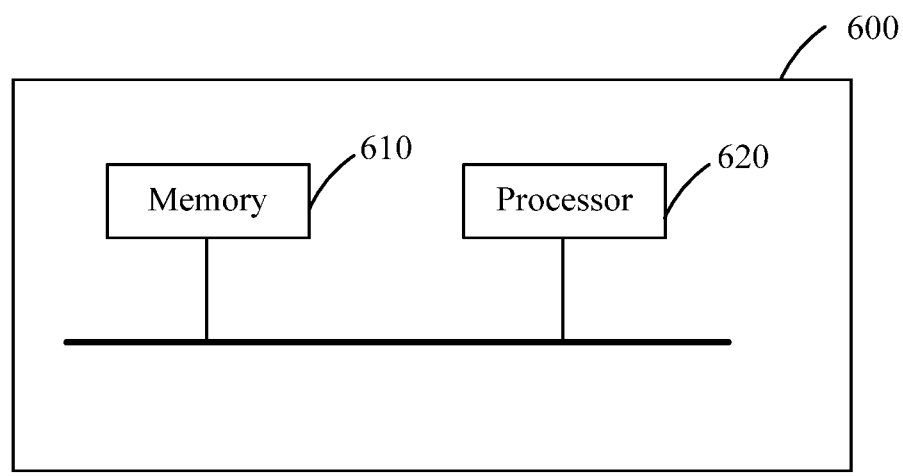
FIG. 10 is a diagram illustrating the structure of a device for image capturing according to embodiment four of the present application.

FIG. 10 is a diagram illustrating the structure of a device 600 for image capturing according to embodiment four of the present application. As shown in FIG. 10, the device for image capturing includes a memory 610 and a processor 620. One or more processors 620 may be disposed in the device for image capturing. In FIG. 10, the arrangement of one processor 620 is taken as an example. In the device for image capturing, the memory 610 and the processor 620 may be connected through a bus or in other manners. In FIG. 10, the memory 610 and the processor 620 are connected through a bus.

As a computer-readable storage medium, the memory 610 may be configured to store a software program, a computer-executable program, and modules, for example, program instructions/modules corresponding to the method of image capturing in embodiments of the present application (for example, a bounding box acquisition module 510, a reference position prediction module 520, and a lens offset determination module 530 that are in an apparatus for image capturing.) The processor 620 executes the software program, instructions or modules stored in the memory 610 to execute various function applications and data processing of the device for image capturing, that is, to perform the preceding method.

In this embodiment, the processor 620 is configured to execute the computer-executable program stored in the memory 610 to perform the following steps: in step S110, the bounding box of a lens tracking target in an image to be captured is acquired; in step S120, a pre-trained reference model is used to predict the first reference position of the image to be captured; in step S130, a lens movement offset is determined based on the position of each pixel in the bounding box and the first reference position.

The device for image capturing provided in this embodiment of the present application performs not only the preceding method operations but also related operations in the method of image capturing provided in any embodiments of the present application.

The memory 610 may mainly include a program storage area and a data storage area. In one embodiment, the program storage area may store an operating system and an application program required by at least one function. The data storage area may store, for example, the data created depending on the use of a terminal. Additionally, the memory 610 may include a high-speed random access memory, and may also include a non-volatile memory, for example, at least one disk memory, flash memory, or another non-volatile solid-state memory. In some examples, the memory 610 may include memories that are remotely disposed relative to the processor 620. These remote memories may be connected to the device for image capturing through a network. Examples of the preceding network include, but are not limited to, the Internet, an intranet, a local area network, a mobile communication network, and a combination thereof.

This embodiment provides a device of image capturing so that capturing is performed by automatically adapting to the change in target postures and the change in capture angels of the camera. Thus the capturing effect is improved and the capturing experience of users is enhanced.

Embodiment Five

The embodiment five of the present application provides a storage medium including computer-executable instructions. When executed by a computer processor, the computer-executable instructions are used to execute a method for image capturing. The method for image capturing includes acquiring the bounding box of a lens tracking target in an image to be captured, using a pre-trained reference model to predict the first reference position of the image to be captured, and determining a lens movement offset based on the position of each pixel in the bounding box and the first reference position.

In the storage medium including computer-executable instructions provided in this embodiment of the present application, the computer-executable instructions perform not only the preceding method operations but also related operations in the method for image capturing provided in any embodiments of the present application.

From the preceding description of embodiments, it may be understood by those skilled in the art that the present application may be implemented by means of software or general-purpose hardware, or may be implemented by hardware. Based on this understanding, the technical solutions provided in the present application may be embodied in the form of a software product. The software product may be stored in a computer-readable storage medium, for example, a computer floppy disk, a read-only memory (ROM), a random access memory (RAM), a flash, a hard disk, or an optical disk, and includes a plurality of instructions for enabling a computer device (which may be a personal computer, a device for image capturing, or a network device) to execute the method according to any embodiments of the present application.

It is to be noted that units and modules involved in the embodiment of the preceding apparatus for image capturing are just divided according to functional logic, but are not limited to the division, as long as the corresponding functions can be implemented. Additionally, specific names of functional units are just intended to distinguish the functional units from each other and are not to limit the protection scope of the present application.

What is claimed is:

1. A method for image capturing, comprising:
   acquiring a bounding box of a lens tracking target in an image to be captured;
   predicting a first reference position of the image to be captured by using a pre-trained reference model; and
   determining a lens movement offset based on a position of each pixel in the bounding box of the lens tracking target in the image to be captured and the first reference position,
   wherein determining the lens movement offset based on the position of each pixel in the bounding box and the first reference position comprises:
   calculating a position offset of each pixel in the bounding box based on the first reference position; and
   calculating the lens movement offset based on the position offset of each pixel in the bounding box.

2. The method according to claim 1, wherein a training process of the pre-trained reference model comprises:
   acquiring a training image and corresponding flag data from a preset image data set, wherein the flag data comprises information of a bounding box of a tracking target in the training image and key point information of the tracking target in the training image;
   acquiring a reference position of a center point of the bounding box based on the information of the bounding box of the tracking target and the key point information of the tracking target;
   acquiring a reference position image corresponding to the training image based on the reference position of the center point of the bounding box;
   predicting a second reference position of the training image so as to obtain a prediction result image by using a deep convolutional neural network;
   calculating a first loss value based on the reference position image and the prediction result image, and adjusting parameters of the deep convolutional neural network based on the first loss value; and
   performing preceding steps sequentially for a plurality of training images in the image data set until the first loss value no longer drops and ending training of the deep convolutional neural network to obtain the pre-trained reference model.

3. The method according to claim 2, wherein acquiring the reference position of the center point of the bounding box based on the information of the bounding box of the tracking target and the key point information of the tracking target comprises:
   generating a grid based on the training image, wherein the training image is divided into W*H grid cells, and W and H are natural numbers greater than 1;
   acquiring second loss values generated in a case where a center of the bounding box is placed in centers of different grid cells; and
   selecting a center position of a grid cell with a smallest second loss value to serve as the reference position of the center point of the bounding box.

4. The method according to claim 3, wherein acquiring the reference position image corresponding to the training image based on the reference position of the center point of the bounding box comprises: acquiring the reference position image corresponding to the training image based on a reference position of a center point of a bounding box of each tracking target, an initial position of the center point of the bounding box of each tracking target, and a number of tracking targets in the bounding box of each tracking target.

5. The method according to claim 3, wherein calculating the position offset of each pixel in the bounding box based on the first reference position comprises:
   calculating the position offset of each pixel in the bounding box based on the first reference position by using formulas $$\begin{cases} DX(x, y) = XT(x, y) - x \\ DY(x, y) = YT(x, y) - y \end{cases},$$

wherein
   DX(x,y) denotes a horizontal offset of each pixel in the bounding box, XT(x, y) denotes a horizontal position of each pixel in the bounding box located at the first reference position, DY(x, y) denotes a vertical offset of each pixel in the bounding box, YT(x, y) denotes a vertical position of each pixel in the bounding box located at the first reference position, X denotes a horizontal position of each pixel in the bounding box, and y denotes a vertical position of each pixel in the bounding box; and
   calculating the lens movement offset based on the position offset of each pixel in the bounding box comprises: calculating the lens movement offset d based on the position offset of each pixel in the bounding box by using formulas $$\begin{cases} d_x = \dfrac{\sum_{(x,y)\in\Theta} DX(x, y)}{\sum_{(x,y)\in\Theta} 1} \\ d_y = \dfrac{\sum_{(x,y)\in\Theta} DY(x, y)}{\sum_{(x,y)\in\Theta} 1} \end{cases},$$

wherein
- $d=(d_x,d_y)$, $d_x$ denotes a horizontal movement offset of a lens, $d_y$ denotes a vertical movement offset of the lens, $(x, y)\in\Theta$ denotes that a pixel $(x, y)\in\Theta$ is in the bounding box $\Theta$, and $\Sigma_{(x,y)\in\Theta}1$ denotes a total number of pixels in the bounding box $\Theta$.

6. The method according to claim 3, wherein the first loss value is calculated by using a formula $L=\Sigma_{x,y}(X_{TG}(x, y)-X_T(x, y))^2+\Sigma_{x,y}(Y_{TG}(x, y)-Y_T(x, y))^2$, wherein
- $X_{TG}(x, y)$ denotes a horizontal position of each pixel in the bounding box and is calculated based on the reference position of the center point of the bounding box, $X_T(x, y)$ denotes a horizontal position of each pixel in the bounding box and is predicted by the deep convolutional neural network, $Y_{TG}(x, y)$ denotes a vertical position of each pixel in the bounding box and is calculated based on the reference position of the center point of the bounding box, and $Y_T(x, y)$ denotes a vertical position of each pixel in the bounding box and is predicted by the deep convolutional neural network.

7. The method according to claim 2, wherein acquiring the reference position image corresponding to the training image based on the reference position of the center point of the bounding box comprises: acquiring the reference position image corresponding to the training image based on a reference position of a center point of a bounding box of each tracking target, an initial position of the center point of the bounding box of each tracking target, and a number of tracking targets in the bounding box of each tracking target.

8. The method according to claim 7, wherein
calculating the position offset of each pixel in the bounding box based on the first reference position comprises: calculating the position offset of each pixel in the bounding box based on the first reference position by using formulas $$\begin{cases} DX(x, y) = XT(x, y) - x \\ DY(x, y) = YT(x, y) - y \end{cases},$$

wherein
- $DX(x, y)$ denotes a horizontal offset of each pixel in the bounding box, $XT(x, y)$ denotes a horizontal position of each pixel in the bounding box located at the first reference position, $DY(x, y)$ denotes a vertical offset of each pixel in the bounding box, $YT(x, y)$ denotes a vertical position of each pixel in the bounding box located at the first reference position, X denotes a horizontal position of each pixel in the bounding box, and y denotes a vertical position of each pixel in the bounding box; and
calculating the lens movement offset based on the position offset of each pixel in the bounding box comprises: calculating the lens movement offset d based on the position offset of each pixel in the bounding box by using formulas $$\begin{cases} d_x = \dfrac{\sum_{(x,y)\in\Theta} DX(x, y)}{\sum_{(x,y)\in\Theta} 1} \\ d_y = \dfrac{\sum_{(x,y)\in\Theta} DY(x, y)}{\sum_{(x,y)\in\Theta} 1} \end{cases},$$

wherein $d=(d_x,d_y)$, $d_x$ denotes a horizontal movement offset of a lens, $d_y$ denotes a vertical movement offset of the lens, $(x, y)\in\Theta$ denotes that a pixel $(x, y)\in\Theta$ is in the bounding box $\Theta$, and $\Sigma_{(x,y)\in\Theta}1$ denotes a total number of pixels in the bounding box $\Theta$.

9. The method according to claim 7, wherein the first loss value is calculated by using a formula $L=\Sigma_{x,y}(X_{TG}(x, y)-X_T(x, y))^2+\Sigma_{x,y}(Y_{TG}(x, y)-Y_T(x, y))^2$, wherein
- $X_{TG}(x, y)$ denotes a horizontal position of each pixel in the bounding box and is calculated based on the reference position of the center point of the bounding box, $X_T(x, y)$ denotes a horizontal position of each pixel in the bounding box and is predicted by the deep convolutional neural network, $Y_{TG}(x, y)$ denotes a vertical position of each pixel in the bounding box and is calculated based on the reference position of the center point of the bounding box, and $Y_T(x, y)$ denotes a vertical position of each pixel in the bounding box and is predicted by the deep convolutional neural network.

10. The method according to claim 2, wherein the first loss value is calculated by using a formula $L=\Sigma_{x,y}(X_{TG}(x, y)-X_T(x, y))^2+\Sigma_{x,y}(Y_{TG}(x, y)-Y_T(x, y))^2$, wherein
- $X_{TG}(x, y)$ denotes a horizontal position of each pixel in the bounding box and is calculated based on the reference position of the center point of the bounding box, $X_T(x, y)$ denotes a horizontal position of each pixel in the bounding box and is predicted by the deep convolutional neural network, $Y_{TG}(x, y)$ denotes a vertical position of each pixel in the bounding box and is calculated based on the reference position of the center point of the bounding box, and $Y_T(x, y)$ denotes a vertical position of each pixel in the bounding box and is predicted by the deep convolutional neural network.

11. The method according to claim 2, wherein
calculating the position offset of each pixel in the bounding box based on the first reference position comprises: calculating the position offset of each pixel in the bounding box based on the first reference position by using formulas $$\begin{cases} DX(x, y) = XT(x, y) - x \\ DY(x, y) = YT(x, y) - y \end{cases},$$

wherein
- $DX(x, y)$ denotes a horizontal offset of each pixel in the bounding box, $XT(x, y)$ denotes a horizontal position of each pixel in the bounding box located at the first reference position, $DY(x, y)$ denotes a vertical offset of each pixel in the bounding box, $YT(x, y)$ denotes a vertical position of each pixel in the bounding box located at the first reference position, X denotes a horizontal position of each pixel in the bounding box, and y denotes a vertical position of each pixel in the bounding box; and
calculating the lens movement offset based on the position offset of each pixel in the bounding box comprises: calculating the lens movement offset d based on the position offset of each pixel in the bounding box by using formulas $$\begin{cases} d_x = \dfrac{\sum_{(x,y)\in\Theta} DX(x, y)}{\sum_{(x,y)\in\Theta} 1} \\ d_y = \dfrac{\sum_{(x,y)\in\Theta} DY(x, y)}{\sum_{(x,y)\in\Theta} 1} \end{cases},$$

wherein $d=(d_x, d_y)$, $d_x$ denotes a horizontal movement offset of a lens, $d_y$ denotes a vertical movement offset of the lens, $(x, y)\in\Theta$ denotes that a pixel $(x, y)\in\Theta$ is in the bounding box $\Theta$, and $\sum_{(x,y)\in\Theta} 1$ denotes a total number of pixels in the bounding box $\Theta$.

12. The method according to claim 1, wherein
calculating the position offset of each pixel in the bounding box based on the first reference position comprises:
calculating the position offset of each pixel in the bounding box based on the first reference position by using formulas $$\begin{cases} DX(x, y) = XT(x, y) - x \\ DY(x, y) = YT(x, y) - y \end{cases},$$

wherein

DX(x, y) denotes a horizontal offset of each pixel in the bounding box, XT(x, y) denotes a horizontal position of each pixel in the bounding box located at the first reference position, DY(x, y) denotes a vertical offset of each pixel in the bounding box, YT(x, y) denotes a vertical position of each pixel in the bounding box located at the first reference position, X denotes a horizontal position of each pixel in the bounding box, and y denotes a vertical position of each pixel in the bounding box; and calculating the lens movement offset based on the position offset of each pixel in the bounding box comprises:
calculating the lens movement offset d based on the position offset of each pixel in the bounding box by using formulas $$\begin{cases} d_x = \dfrac{\sum_{(x,y)\in\Theta} DX(x, y)}{\sum_{(x,y)\in\Theta} 1} \\ d_y = \dfrac{\sum_{(x,y)\in\Theta} DY(x, y)}{\sum_{(x,y)\in\Theta} 1} \end{cases},$$

wherein $d=(d_x, d_y)$ $d_x$ denotes a horizontal movement offset of a lens, $d_y$ denotes a vertical movement offset of the lens, $(x, y)\in\Theta$ denotes that a pixel $(x, y)\in\Theta$ is in the bounding box $\Theta$, and $\sum_{(x,y)\in\Theta} 1$ denotes a total number of pixels in the bounding box $\Theta$.

13. The method according to claim 12, wherein the first loss value is calculated by using a formula $L=\sum_{x,y}(X_{TG}(x, y)-X_T(x, y))^2 + \sum_{x,y}(Y_{TG}(x, y)-Y_T(x, y))^2$, wherein $X_{TG}(x, y)$ denotes a horizontal position of each pixel in the bounding box and is calculated based on the reference position of the center point of the bounding box, $X_T(x, y)$ denotes a horizontal position of each pixel in the bounding box and is predicted by the deep convolutional neural network, $Y_{TG}(x, y)$ denotes a vertical position of each pixel in the bounding box and is calculated based on the reference position of the center point of the bounding box, and $Y_T(x, y)$ denotes a vertical position of each pixel in the bounding box and is predicted by the deep convolutional neural network.

14. A device for image capturing, comprising a memory and a processor, wherein the memory is configured to store a computer program executable by the processor, and the processor is configured to execute the computer program to perform the method for image capturing according to claim 1.

15. A non-transitory computer-readable storage medium storing a computer program, wherein the computer program comprises program instructions, when executed, to perform the method for image capturing according to claim 1.

16. The method according to claim 1, wherein a training process of the pre-trained reference model comprises:
acquiring a training image and corresponding flag data from a preset image data set, wherein the flag data comprises information of a bounding box of a tracking target in the training image and key point information of the tracking target in the training image;
acquiring a reference position of a center point of the bounding box based on the information of the bounding box of the tracking target and the key point information of the tracking target;
acquiring a reference position image corresponding to the training image based on the reference position of the center point of the bounding box;
predicting a second reference position of the training image so as to obtain a prediction result image by using a deep convolutional neural network;
calculating a first loss value based on the reference position image and the prediction result image, and adjusting parameters of the deep convolutional neural network based on the first loss value; and
performing preceding steps sequentially for a plurality of training images in the image data set until the first loss value no longer drops and ending training of the deep convolutional neural network to obtain the pre-trained reference model.

17. An apparatus for image capturing, comprising:
a processor and a memory storing processor-executable instructions which, when executed by the processor, are configured to:
acquire a bounding box of a lens tracking target in an image to be captured;
predict a first reference position of the image to be captured by using a pre-trained reference model; and
determine a lens movement offset based on a position of each pixel in the bounding box of the lens tracking target in the image to be captured and the first reference position,
wherein to determine the lens movement offset based on the position of each pixel in the bounding box and the first reference position comprises:
calculating a position offset of each pixel in the bounding box based on the first reference position; and
calculating the lens movement offset based on the position offset of each pixel in the bounding box.

* * * * *